J. BEALL & C. C. BURROUGHS.
CORN-SHELLER.

No. 173,106.  Patented Feb. 8, 1876.

WITNESSES:  INVENTORS:
Levi P. Abraham  John Beall,
Jno. W. Lyon  Caleb C. Burroughs.
  per Chas P. Housum,
  Atty.

UNITED STATES PATENT OFFICE.

JOHN BEALL AND CALEB C. BURROUGHS, OF DECATUR, ILLINOIS.

IMPROVEMENT IN CORN-SHELLERS.

Specification forming part of Letters Patent No. 173,106, dated February 8, 1876; application filed October 18, 1875.

*To all whom it may concern:*

Be it known that we, JOHN BEALL and CALEB C. BURROUGHS, of Decatur, in the county of Macon and State of Illinois, have invented a new and useful Improvement in Corn-Shellers, which improvement is fully set forth in the following specification, reference being had to the accompanying drawings.

The object of our invention is to so construct a corn-sheller that the cone-shaped cylinder can be adjusted in the cone-shaped casing, to adapt the machine for the different conditions of the corn; and consists of a plate abutting against the shaft of the cylinder, said plate adjusted with set-screws, the cone-shaped cylinder and casing being on different planes.

Figure 1:
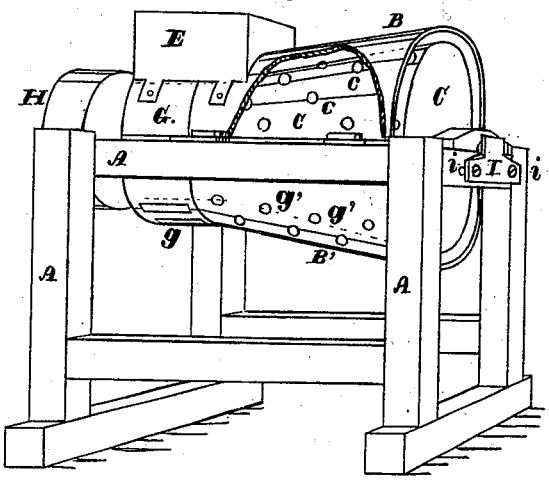
Figure 2:
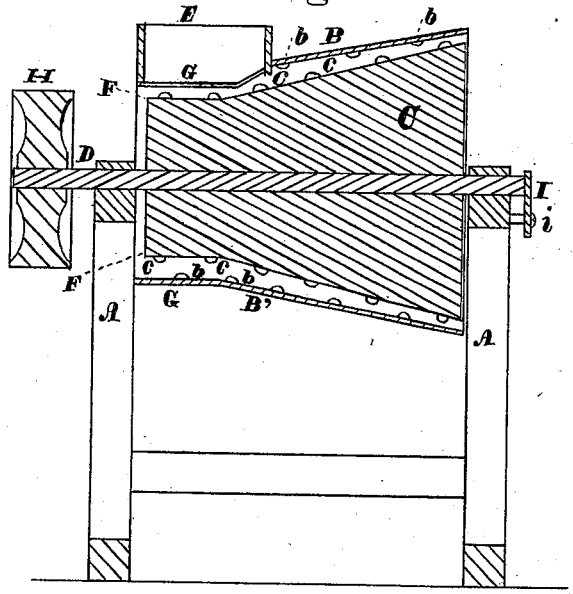

Figure 1 is a perspective view of our invention, showing the casing broken, and Fig. 2 is a tranverse longitudinal section of the same.

A represents the frame; B B', the upper and lower casing, provided with teeth *b b*, either round or square; C, the cylinder, also provided with the teeth *c c*; D, the shaft to which the cylinder is attached; H, the driving-pulley; E, the hopper, through which the corn is fed to the machine. Part of the cylinder, as shown at F, and the casing, as at G, is made straight, the casing provided with slots *g g*. The cone-shaped part of the casing is also perforated with the holes *g' g'*, to permit the corn to escape when shelled off. I is a plate abutting against the shaft. This plate is attached to the frame with the screws *i i*. By this arrangement the cylinder can be adjusted in the casing to suit the different conditions of dry or damp grain, and adjusted while the machine is in operation.

Other devices may be used to abut against, or to adjust, the cylinder in the casing. The centrifugal force will always keep the end of the shaft against the plate, and no adjusting device or collar is required between the driving-pulley and the frame.

The machine operates as follows: As the corn is fed into the hopper the centrifugal force throws the corn toward the large end of the cone. The lines of the cones of the casing and the cylinder are on different planes, so that, as the corn progresses toward the large end of the cones, the space becomes smaller between the casing and the cylinder, insuring the removal of all the corn from the cob. Part of the grain drops through the slots and holes in the casing, and the balance is thrown out of the casing, at the base, along with the cobs. Suitable arrangements can be made for catching and conveying the corn and cobs away from the machine.

We claim as our invention—

The combination of the casing B B', cylinder C, shaft D, plate I, and set-screws *i i*, when constructed and arranged as shown and described.

JOHN BEALL.
CALEB C. BURROUGHS.

Witnesses:
JOHN W. LYON,
LEVI P. GRAHAM.